United States Patent [19]

Irwin

[11] Patent Number: 5,006,630

[45] Date of Patent: Apr. 9, 1991

[54] SOLUBLE AMORPHOUS PARA-ORIENTED AROMATIC POLYAMIDE FROM 2,2'-DIBROMO-5,5'-DIMETHOXY-[1,1'-BIPHENYL]-4,4'-DIAMINE

[75] Inventor: Robert S. Irwin, Wilmington, Del.

[73] Assignee: E. I. Du Pont de Nemours and Company, Wilmington, Del.

[21] Appl. No.: 374,688

[22] Filed: Jun. 30, 1989

[51] Int. Cl.[5] ............................................. C08G 69/32
[52] U.S. Cl. .................................... 528/185; 528/344; 528/348
[58] Field of Search .................. 528/185, 348, 344

[56] References Cited

PUBLICATIONS

The Condensed Chemical Dictionary; Eighth Edition, 1971, p. 448.
Macromolecules 1985, vol. 18, pp. 1058–1068.
J. Polymer Science, Part A: Polymer Chemistry, vol. 25, pp. 1249–1271 (1987).

*Primary Examiner*—Harold D. Anderson

[57] ABSTRACT

Amorphous para-oriented aromatic homo- and co-polyamides are prepared from terephthaloyl chloride or 2,6-naphthoyl chloride and 2,2'-dibromo-5,5'-dimethoxy-[1,1'-biphenyl]-4,4'-diamine with up to 92.5 mol % of certain other diamines.

5 Claims, No Drawings

SOLUBLE AMORPHOUS PARA-ORIENTED AROMATIC POLYAMIDE FROM 2,2'-DIBROMO-5,5'-DIMETHOXY-[1,1'-BIPHENYL]-4,4'-DIAMINE

BACKGROUND OF THE INVENTION

Crystalline para-oriented aromatic polyamide fiber, such as poly(p-phenylene terephthalamide) have been spun from concentrated sulfuric acid solution. While crystallinity is desired for many uses, there are applications where noncrystalline polymers and highly oriented fibers and films of amorphous oriented aromatic polyamides permit processing, modification or properties not attainable with crystalline products. Stable, highly amorphous character is not usually easy to achieve in condensation polymers and often the result is a high degree of solvent sensitivity and lack of dimensional stability at elevated temperatures.

Essentially amorphous aromatic polyterephthalamides are described in Macromolecules 1985, v. 18, pp 1058-1068 and J. Poly. Sci. Part A: Polymer Chem. V 25, 1249-1271 (1987). The noncoplanar conformation of certain of the polyamides disclosed in these publications is said to enhance solubility. The authors refer to solubility in amide solvents, such as tetramethylurea (TMU) even without LiCl, a known solubility promoter. Omission of the salt results in a cost-saving but more importantly, avoids the need for salt elimination by washing with water and drying. However, the particular soluble polyterephthalamide mentioned cannot be spun from sulfuric acid solution because the aromatic —$CF_3$ group is unstable therein and is converted to —$CO_2H$ and beyond. The present invention provides new aromatic homopolyterephthalamides and homo-2,6-naphthalamides that overcome such deficiencies and certain copolymers thereof, as well as fibers and films of the polymers.

SUMMARY OF THE INVENTION

The present invention is directed to a new family of amorphous high molecular weight para-oriented aromatic homopolyamides that are soluble in dimethylacetamide (DMAc) and N-methylpyrrolidone (NMP) even in the absence of metal salts. The polymers have an inherent viscosity of at least 1.0 and encompass the homopolymers.

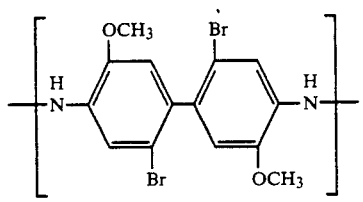

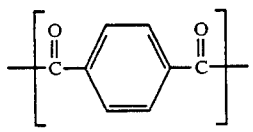

or

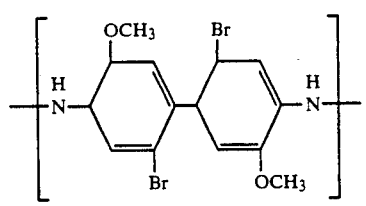

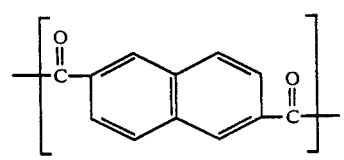

and copolymers thereof in which up to 92.5 mol %, preferably u to 50 mol %, of the diamino moiety is replaced by

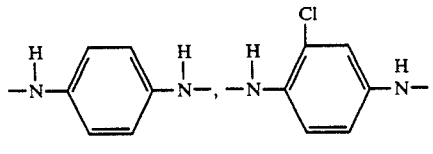

or

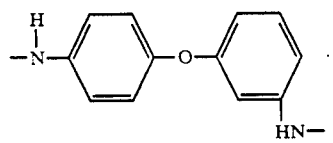

DETAILED DESCRIPTION OF THE INVENTION

The key monomer for polymers of the invention, is 2,2'-dibromo-5,5'-dimethoxy-[1,1'-biphenyl]-4,4'-diamine. This diamine is disclosed in Chem. and Industry, 1935, p. 213. To form the homopolymer, this diamine is reacted with terephthaloyl chloride or 2,6-naphthoyl chloride. High molecular weight polymer, inherent viscosity ($\eta_{inh}$) of at least 1.0 is prepared by this method. One may obtain fluid solutions of the polymer in DMAc or NMP, without metal salts. As polymer inherent viscosity increases above about 4, stronger solvents such as sulfuric acid are employed to obtain fluid solutions. Gel formation in the organic medium may occur as the polymer concentration increases, but these gels may be fluidized on heating.

Polymerization of terephthaloyl chloride with 2,2'-dibromo-5,5'-dimethoxy-[1,1'-biphenyl]-4,4'-diamine to yield high molecular weight polymer (inherent viscosity up to about 10) may be carried out under standard conditions in a solvent such as NMP or DMAc. The reactants combine in substantially stoichiometric proportions to yield the polymer in solution. Calcium chloride, lithium chloride and the like are not required to achieve dissolution. The dopes may be converted directly to fibers, films or fibrids without any intermediate step of redissolving the polyamide in strong acid such as sulfuric acid. Achievement of high molecular weight as well as solubility is quite surprising since the polyamide from the analogous 5,5'-dimethoxy-[1,1'-biphenyl]-4,4'-diamine and terephthaloyl chloride precipitates out of solution at low molecular weight (inherent viscosity = 1.33) as shown in Comparative Example A.

The polymers of the invention may be oriented by drawing but remain non-crystalline. The amorphous nature of the polymer makes it possible to modify properties by use of additives which can penetrate the macromolecular structure quite homogeneously. This is not possible with highly crystalline structures present in fibers or films of poly(p-phenylene terephthalamide).

Fibers and films of polymers of the invention cannot be redissolved in organic solvents once formed and dried and thus are resistant to shrinkage or other deleterious effects of organic solvents. Conventionally, polymers must be crystallized to achieve such resistance.

The polymers of the invention are flame resistant. If desired, however, flame retarding additives such as $Sb_2O_3$ may be incorporated.

Measurements

Inherent viscosity, $\eta_{inh}$, is defined by the following equation:

$$\eta_{inh} = \frac{\ln(\eta_{rel})}{C}$$

where $\eta_{rel}$ is the relative viscosity and C is the concentration in grams of polymer per deciliter of solvent, typically 0.5g in 100 ml. (Thus, the units for inherent viscosity are dl/g.) The relative viscosity, $\eta_{rel}$, is determined by dividing the flow time of the dilute solution in a capillary viscometer by the flow time for the pure solvent. The flow times are determined at 30° C. The solvents employed are the NMP or DMAc reaction medium prior to polymer precipitation or sulfuric acid on precipitated polymer.

TGA

Thermal Gravemetric Analysis (TGA) measurements were made on the Du Pont 2100 Thermal Analyzer using the Model 951 TGA attachment. Samples weighing 5 to 15 mg were run at 20° C./min up to 600° C. plotting weight loss vs. temperature.

Tensile

Tensile measurements were made on single filaments following the test procedure found in ASTM D 2101-82 The filaments were conditioned at 21° C. (70° F.) and 65 percent relative humidity and tested on a conventional tensile tester using flat clamps with rubber facing and a 2.5 cm (1") gauge length at a 10%/min strain rate (for low elongation, 0–8%). T is tenacity at break in gpd, M is the initial modulus in gpd and E is the break elongation in %. The 0.64 cm (0.25 inch) wide film strips were tested in an analogous manner.

Procedure For Determination Of The Fiber X-ray Orientation Angle

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film (Catalogue Number 154–2463), in a Warhus pinhole camera. Collimators in the camera are 0.64 mm in diameter. The exposure is continued for about fifteen to thirty minutes (or generally long enough so that the diffraction feature to be measured is recorded at an Optical Density of ~1.0).

A digitized image of the diffraction pattern is recorded with a video camera. Transmitted intensities are calibrated using black and white references, and gray level is converted into optical density. A data array equivalent to an azimuthal trace through the selected equatorial peaks (or, in the case of non-crystalline material, through the oriented amorphous scattering maxima) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, this is not an integral number). Both peaks are measured and the Orientation Angle is taken as the average of the two measurements.

Crystallinity Index

Crystallinity Index for fibers of poly(p-phenylene terephthalamide) and related polymers are derived from X-ray diffractograms of the fiber materials. The diffraction pattern of poly-p-phenylene terephthalamide is characterized by the X-ray peaks occurring at about 20° and 23° (2 Θ). As crystallinity increases, the relative overlap of these peaks decreases as the intensity of the crystalline peaks increases. The Crystallinity Index of poly-p-phenylene terephthalamide is defined as the ratio of the difference between the intensity values of the peak at about 23° and the minimum of the valley at about 22° to the peak intensity at about 23°, expressed as percent. It is an empirical value and must not be interpreted as percent crystallinity.

X-ray diffraction patterns of yarn samples are obtained with an X-ray diffractometer (Philips Electronic Instruments; ct. no. PW1075/00) in reflection mode. Intensity data are measured with a rate meter and recorded either on a strip-chart or by a computerized data collection-reduction system. The diffraction patterns were obtained using the instrumental settings:

Scanning Speed 1°, 20 per minute;
Time Constant 2;
Scan Range 6° to 38°, 2 Θ and
Pulse Height Analyzer, "Differential".

The Crystallinity Index is calculated from the following formula:

$$\text{Crystallinity Index} = \frac{(A - C) \times 100}{A - D}$$

where
A = Peak at about 23°,
C = Minimum of valley at about 22°, and
D = Baseline at about 23°.

EXAMPLES

The following examples, except for Comparative Example A, are illustrative of the invention and are not to be construed as limiting.

EXAMPLE 1

A solution of 12.48 g 2,2'-dibromo-5,5'-dimethoxy-[1,1-biphenyl]-4,4'-diamine (0.031 mole) dissolved in 283.5 g NMP (275 ml) was cooled to 5°-10° C. 6.27 g terephthaloyl chloride (0.031 mole) was added to the well-stirred solution. It rapidly dissolved and viscosity of the solution increased during 20 min to ultimately provide a stiff gel. After standing 15 hr at 21° C., a specimen of this 5.5% gel was diluted to 0.5% solids for inherent viscosity measurement: $\eta_{inh}=9.8$ in NMP. A polymer specimen, precipitated into water, gave $\eta_{inh}=7.9$ in 100% sulfuric acid.

Satisfactory results can be anticipated if 2,6naphthoyl chloride is employed in place of terephthaloyl chloride in this example.

COMPARATIVE EXAMPLE A

To a solution of 14.39 g dianisidine (0.059 mole; 95% purity) in 378 g NMP (367 ml) containing 9.05 g, anhydrous $CaCl_2$ (0.082 mole), cooled to 5°-10° C., was added 11.88 g terephthaloyl chloride (0.059 mole). Within a few minutes the initially clear solution opacified as precipitate formed and viscosity failed to increase. Analysis of supernatant liquid after standing 1 hour showed it to consist of NMP and $CaCl_2$, but no polymer. The precipitated polymer had a $\eta_{inh}$ of 1.33 measured in sulfuric acid.

EXAMPLE 2

15.5 g 2,2'-dibromo-5,5'-dimethoxy-[1,1'-biphenyl]-4,4'-diamine (0.0375 mole) was dissolved in 169 ml N-methylpyrrolidone (174 g) containing 5.8 g dissolved anhydrous $CaCl_2$ (0.053 mole) and the solution cooled to 5°-10° C. 7.61 g terephthaloyl chloride (0.0375 mole) was added to the stirred solution which became extremely viscous after several minutes and remained isotropic as indicated by its clarity. To improve fluidity, the solutions were diluted from 10.0% polymer solids to 6.2% by addition of solvent. HCl formed in the polymerization was neutralized by reaction with 2.06 g anhydrous calcium oxide (0.0375 mole). Polymer $\eta_{inh}$ was 3.62 measured in 100% sulfuric acid. Films were cast on glass plates, dried at 100° C. under vacuum, soaked in water to extract $CaCl_2$ for 2 hr/25° C. and 1 hr/60° C., then dried at 100° C. They were cut into 0.64 cm (0.25 inch) wide strips and drawn 1.75X over a 2 inch hot plate at 300° C. Wide angle X-ray analysis showed that the films were non-crystalline before and after hot stretching but in the latter case, an orientation angle of 23° had developed. Tenacity and modulus had increased from 0.9/28 to 2.6/72 gpd. Thermogravimetric analysis (TGA) showed that weight loss became significant above 350° C.

Examples 3, 4 and 5 which follow, describe preparation of copolymer from terephthaloyl chloride (or alternately 2,6-naphthoyl chloride) and a combination of two diamines, 1,4-phenylene diamine and 2,2'-dibromo5,5'-dimethoxy-[1,1'-biphenyl]-4,4'-diamine, said reacting diamines being in the molar proportions of 92.5/7.5 respectively in Ex 3, 80/20 in Ex 4 and 50/50 in Ex 5.

EXAMPLE 3

A solution of 46.07 g 1,4-phenylene diamine (0.427 mole) and 12.97 g 2,2'-dibromo-5,5'-dimethoxy[ 1,1'-biphenyl]-4,4'-diamine (0.0346 mole) in 1095 ml NMP (1128 g) containing 71.0 g anhydrous $CaCl_2$ (0.65 mole) was cooled to 5° C. and treated with 93.62 g terephthaloyl chloride (0.461 mole) to form a gel or crumb. This was precipitated by water in a blender, filtered, washed, dried to give 117 g copolymer with an inherent viscosity of 3.65 measured in sulfuric acid. The polymer was dissolved in 100% sulfuric acid to form a spin dope of 19% (w/w) solids. This dope, held in a reservoir at 70° C., was heated to 80° C. during extrusion through a 10-hole spinneret (0.002 inch per hole diameter), with a back pressure of 200 psi, through a short air-gap into a cocurrent of cold water. Yarn was wound up at 100 ypm. The inherent viscosity of the yarn polymer was 3.32 measured in sulfuric acid. The as-spun fibers had a bent stress-strain curve, indicative of imperfect orientation, and average T/E/Mi=14.3 gpd/5.4%/435 gpd. X-ray analysis showed negligible crystallinity but an orientation angle of 18°. By heating the fibers for a few seconds under tension at 350°-500° C., there was a distinct improvement in properties. Thus after treatment at 500° C., T/E/Mi were 20.3/2.8/730 with orientation angle of 12°. The stress-strain curve now indicated slight strain-hardening. The crystallinity index was 33.

Comparable results can be expected by replacement of terephthoyl chloride with an equimolar amount of 2,6-naphthoyl chloride.

EXAMPLE 4

A copolymer with an $\eta_{inh}$ of 5.25 in sulfuric acid was prepared by the same procedure as in Example 3 in which terephthoyl chloride was used. A solution at 16.5% solids in 100% sulfuric acid at 80° C. was excessively viscous for spinning. Lower inherent viscosity copolymer ($\eta_{inn}=3.60$) at 16% solids in sulfuric acid had suitable viscosity for spinning. At 80° C. it was extruded through a 20-hole spinneret (0.003 inch diameter holes) through a small air-gap into water at 2° C. and wound up at 100 ypm. As-spun fibers had average T/E/Mi/dpf=9.8/6.5/283/3.8 (best values 12.3/7.9/326/3.3); the stress-strain curve showed a distinct knee; $\eta_{inh}$ was 3.54 in 100% $H_2SO_4$; density was 1.484 g/cc. X-rays showed no crystallinity and an orientation angle of about 26°. Tensioned heat-treatment at 350° C. to 450° C. failed to develop significant crystallinity although orientation improved. Heat treatment at 400° C. gave fibers with T/E/Mi=12.2/3.7/400 (best values 13.6/2.4/490), with considerable straightening of the stress-strain curve, and orientation angle of 14°.

EXAMPLE 5

This copolymer was prepared by the procedure of Ex. 3 as a gel at 5.5% solids in NMP/CaCl, and had an inherent viscosity of 6.18 in 96% sulfuric acid.

EXAMPLE 6

A copolymer was prepared from terephthaloyl chloride, chloro-1,4-phenylene diamine and 2,2'-dibromo-5,5'-dimethoxy-[1,1'-biphenyl]-4,4'-diamine (with the diamines in a ratio of 30/70 mole %, respectively) by a procedure similar to Ex. 3 except the solvent was DMAc. At the conclusion of the polymerization, the copolymer at 5.8% solids in $DMAC/CaCl_2$ was still in solution which was clear and viscous. The inherent viscosity of the copolymer was 6.94 (in DMAc). White fibers were obtained by dry spinning.

A copolymer analogous to that obtained in this example would result by use of 2,6-naphthoyl chloride as the dicarboxylic acid reactant.

EXAMPLE 7

To a solution in 273 ml NMP (282 g) containing 4.17 g 3,4'-oxydianiline (0.021 mole) and 8.42 g 2,2'-dibromo-5,5'-dimethoxy[1,1'-biphenyl]-4,4'-diamine (0.021 mole), cooled to 5°–10° C., was added 8.46 g terephthaloyl chloride (0.042 mole), with stirring. Solution viscosity increased to an estimated 1500-2000 poises. 2.33 g anhydrous CaO (0.0417 mole) was mixed in. (The inherent viscosity of the copolymer was 3.36 measured in NMP.)

Films were cast on glass plates using a 0.04 inch wide doctor knife, dried at 80° C. overnight, soaked in water several days to extract $CaCl_2$, dried at 100° C., and cut into 0.64 cm (0.25 inch) wide strips. These were stretched over a hot plate at various temperatures and tensile properties measured (highest tenacity in parentheses).

| Draw Temp. (°C.) | Draw Ratio | $T(T)_{max}$ (gpd) | E (%) | Mi (gpd) | Denier |
|---|---|---|---|---|---|
| 0 | As cast | 0.6(0.8) | 15 | 21 | 4200 |
| 350 | 4.0X | 6.4(7.5) | 4.8 | 170 | 1033 |
| 375 | 4.5X | 5.0(7.1) | 2.8 | 187 | 863 |
| 400 | 5.5X | 4.6(5.8) | 2.9 | 208 | 716 |
| 525 | 5.75X | 4.6(5.4) | 2.6 | 217 | 612 |

X-rays showed that drawing at 375° C. gave an amorphous material with orientation angle of 36°. Density of as-cast film (1.452±0.05%) did not significantly change on drawing, e.g., 1.456±0.06% at 475° C.

Use of an equimolar quantity of 2,6-naphthoyl chloride in place of terephthaloyl chloride can be expected to yield comparable results.

EXAMPLE 8

This copolymer was prepared, at 6% solids, in the same way as in Example 7, to give a clear gel. In this example the same reacting diamines were present in 20/80 molar proportions, the 3,4'-oxydianiline being the minor component. The polymer $\eta_{inh}$ in NMP was 5.82. The gel was fluidized by heating.

I claim:

1. Amorphous para-oriented aromatic copolyamide consisting essentially of units of the formula

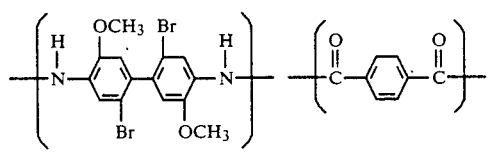

or

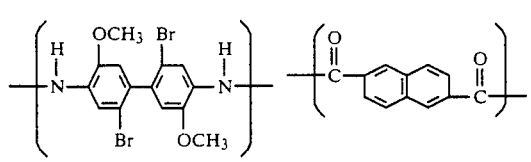

or copolyamide thereof in which u to 92.5 mol % of the diamino moiety is replaced by

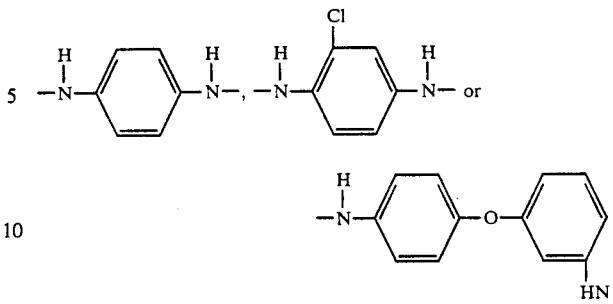

said polymer having an inherent viscosity, $\eta inh$, of at least 1.0, where $$\eta inh = \frac{\ln(\eta rel)}{C}$$

where $\eta rel$ is the relative viscosity measured at 30° C. and C is the concentration in grams of polymer per deciliter of sulfuric acid.

2. The copolyamide of claim 1 wherein up to 50 mol % of the diamino moiety is replaced by

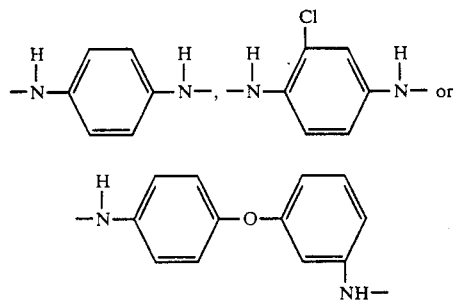

3. A fiber of the polymer of claim 1.
4. A film of the polymer of claim 1.
5. Amorphous para-oriented aromatic copolyamide consisting essentially of units of the formula

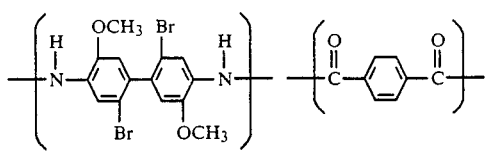

or

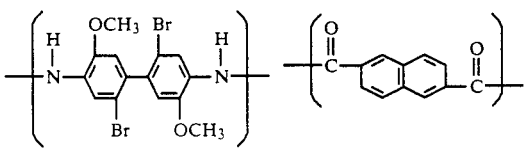

said polymer having an inherent viscosity, $\eta inh$, of at least 1.0, where $$\eta inh = \frac{\ln(\eta rel)}{C}$$

where $\eta rel$ is the relative viscosity measured at 30° C. and C is the concentration in grams of polymer per deciliter of sulfuric acid.

* * * * *